United States Patent [19]

Lodewijk

[11] Patent Number: 4,663,255

[45] Date of Patent: May 5, 1987

[54] ELECTRIC BATTERY

[75] Inventor: Anselrode Lodewijk, St. Anthonis, Netherlands

[73] Assignee: Stork Screens B.V., Boxmeer, Netherlands

[21] Appl. No.: 570,645

[22] Filed: Jan. 13, 1984

[30] Foreign Application Priority Data

Jan. 13, 1983 [NL] Netherlands ............ 8300122

[51] Int. Cl.$^4$ .................. H01M 6/04; H01M 2/38
[52] U.S. Cl. ........................... 429/206; 429/68; 429/229; 429/120
[58] Field of Search ............... 429/67–70, 429/72, 81, 120, 229, 206

[56] References Cited

U.S. PATENT DOCUMENTS

| | | | |
|---|---|---|---|
| 3,049,578 | 8/1962 | Jonsson et al. | 429/81 |
| 3,767,466 | 10/1973 | McCoy et al. | 429/68 X |
| 3,887,400 | 6/1975 | Doniat | 429/70 X |
| 4,147,839 | 4/1979 | Solomon et al. | 429/67 X |
| 4,172,924 | 10/1979 | Wrszawski | 429/68 X |
| 4,314,008 | 2/1982 | Blake | 429/120 X |
| 4,463,064 | 7/1984 | Ruch et al. | 429/72 X |

Primary Examiner—Brian E. Hearn
Assistant Examiner—Stephen J. Kalafut
Attorney, Agent, or Firm—Watson, Cole, Grindle & Watson

[57] ABSTRACT

An electric battery consisting of an electrolyte-containing chamber and an anode as well as a cathode in contact with the electrolyte in the electrolyte-containing chamber. A suspension of zinc is in the electrolyte-containing chamber and the suspension is circulated in the chamber, by a pump or stirring element. The chamber may also be provided with turbulence-generating members consisting, e.g., of a helical band attached to the wall of an electrode or a ribbon shaped electrode being helically wound in one plane. The zinc particles are preferably supported by cellulose fibers and may be surrounded by a thin hydrophilic layer acting as a porous resistant layer. Preferably the battery is provided with temperature control element. One of the electrodes consist of a porous copper strip and a nickel layer partially converted into nickel oxide-nickel hydroxyde and forming the active material deposited upon the strip.

10 Claims, 10 Drawing Figures

ELECTRIC BATTERY

BACKGROUND OF THE INVENTION

This invention relates to a battery comprising a casing provided with an electrolyte-accommodating chamber containing an electrolyte, at least two metal electrodes in contact with the electrolyte and having electrode terminals, and two metal-containing active materials which can each electrically conductively communicate with one electrode only, as well as a porous separator for separating the two metal-containing active materials.

Electric batteries are known per se.

The best-known electric battery is the lead battery consisting of a glass jar with an anode being provided with a lead layer and being discharged by means of a sulfuric acid electrolyte while emitting electrons, the cathode containing a layer of lead oxide which is converted into lead sulfate under the influence of the sulfuric acid electrolyte present by accepting electrons. Such a lead battery can be easily regenerated by reversing the aforesaid reactions.

Such lead batteries have now been improved to a maximum extent so that they deliver a power of 22 to 35 Whr/kg and a power per unit of time of 150 W/kg, their useful life span having been increased to 1500 complete charge and discharge cycles with a maximum degree of temperature and shock resistance. For traction purposes, however, the known lead battery has moderate qualities, while the corrosive sulfuric acid is not very attractive.

Furthermore, there is known a nickel-iron battery having a long useful life span but having relatively bad qualities.

Although the known nickel-zinc battery has very good qualities indeed, it has a relatively limited life span. It has been established that in these batteries the zinc electrode is the cause of the instability of the electric battery. For, in the discharged state, the zinc is present in the form of zinc oxide or zin hydroxide, whereas, when being charged, there occurs again metallic zinc which has, however, the tendency of forming dendrites, thus reducing the effective surface area and encouraging deformation of the electrode. Such deformation easily results in short circuiting. In addition, it seems that the nickel electrode is easily poisoned under the influence of zinc ions.

The EMF of a nickel-zinc battery is 1.7 V, whereas it is 1.3 V only in the case of a nickel-iron battery.

In its behavior, the known silver-zinc battery resembles the nickel-zinc battery, and produces higher energy densities and a higher discharge current, but it is less advisable for certain applications. In particular, the cost of silver renders this electric battery less attractive.

Finally, a nickel-cadmium battery can also be mentioned, which with respect to the discharging under short-circuit conditions, compares favorably with the others, but has only moderate qualities in other respects. Moreover, this battery has the drawback of the poisonous properties of cadmium.

A common drawback of all batteries known in the art is the fact that the velocity of their various reactions is determined by diffusion, i.e., the reaction velocity is limited.

SUMMARY OF THE INVENTION

It is therefor a main object of the present invention to provide an electric battery not having the aforementioned drawbacks.

This object is attained according to the invention in that at least one metal-containing active material is movable incorporated in the electrolyte and that electrolyte-circulating means is provided for circulating the electrolyte with active material in the electrolyte-containing chamber.

Such an electric battery has the following advantages:

(a) The casing can serve both as pole material and as an armoring, thus resulting in a substantial electric-battery weight saving.

(b) The flowing of the electrolyte containing the usually suspended active material results in a faster, more complete chemical conversion and thus in increased energy density and a higher charging and discharge current.

(c) The battery can be better cooled or heated. Particularly heating is very important as chemical reactions occurring in such a cell are very much dependent upon the temperature. By increasing the temperature from, for example, 20 to 50° C., a battery can deliver a much higher current.

The electrolyte and the metal-containing active material comprised therein can be easily replaced by simply draining off the liquid mass.

(d) It is possible to enhance the chemical reactions occurring with one or both of the active materials by employing auxiliary chemicals.

(e) It is possible to use a metal casing which provides a comparatively very strong reservoir, as a result of which the battery can be operated under pressure.

(f) Gas possibly formed during reactions can be exhausted in a simple manner.

(g) A suspension of an active material in the electrolyte can be recirculated in a relatively simple manner while bringing about only a small loss of energy.

(h) The suspension of the electrolyte with the active material can be easily regenerated outside the cell, as a result of which, after exhaustion of the composition of electrolyte with the active-material particles suspended therein, the battery will be quickly available for further use.

The electrolyte-circulating means conveniently consists of a pump connected to an outlet and an inlet of the electrolyte-accommodating chamber.

Effectively, turbulence-generating members are provided in the electrolyte-accommodating chamber, thus enhancing the turbulence of the suspension of electrolyte and metal-containing active material, and promoting the collecting of current by an electrode.

Turbulence-generating members may advantageously consist of a helical strip attached to the wall of an electrode; in the case of a tubular electrode the strip can be helically wrapped around it.

According to a particularly preferred embodiment the electrolyte-circulating means are located in the electrolyte-accommodating chamber, and comprise liquid-stirring and/or liquid-propelling members.

This embodiment is recommended particularly for small-sized batteries in which a large quantity of energy can be stored by using strongly concentrated, especially pasty, suspensions of electrolyte and active material. Even if such concentrated or pasty suspensions would be pumpable, they would move through the electrolyte-accommodating chamber as one coherent mass, thus rendering the chance of contact between an electrode and particles of this active material, and consequently the power supply, relatively small. The aforementioned measure according to the invention eliminates this aspect.

An appropriate embodiment of the present battery enhanced stirring action or the propelling force of aforementioned electrolyte-circulating means is provided. A proper propelling effect is especially desirable to achieve effective temperature distribution and temperature control in the electrolyte.

It goes without saying that the battery can also be provided with plate-shaped electrodes, part of the plates being capable of coming into contact with the particles of an active material in the electrolyte, whereas the other plates are surrounded by a porous separating wall. Employing plates affords the formation of a large surface area which comes into contact with the particles of the active material in the electrolyte, as a result of which large electric currents can be generated.

According to a very effective embodiment the active material in the electrolyte is in particulate form, the particles of active material being supported on inactive carrier particles, i.e., the active material constitutes a portion of a plurality of composite particles.

Preferably, the suspended particles of the active material are surrounded by a thin, porous, wear-resistant layer, preferably a hydrophilic layer, such as tanned polyvinyl alcohol or polyvinyl acetate. The wear-resistant layer or the carrier particles may contain conductive particles, such as carbon particles, which are inert with respect to the electrolyte.

According to a particularly preferred embodiment, the electrolyte-containing chamber contains a suspension of zinc in an alkaline electrolyte.

In the embodiments as shown the battery comprises an anodic compartment containing anodic active materials in electrolyte. However, it will be obvious that the battery may also comprise a cathodic compartment containing cathodic active material in electrolyte such as, e.g., nickel sheets provided with an oxide/hydroxyde skin. The cathode is then accommodated in the cathodic space.

At last the battery may only comprise a cathodic compartment containing electrolyte and cathodic active material as mentioned hereinbefore. The wall of the cathodic compartment is then formed by the anode.

In a very much preferred embodiment, the battery comprises several tubular or plate-shaped elements interconnected in series or in parallel and serving as an electrode.

Effectively, when using tubular elements, they are disposed horizontally, which affords easy replacement of the tubular elements and in addition ensures smooth recirculation of electrolyte having active particles suspended therein.

DESCRIPTION OF THE PREFERRED EMBODIMENTS

Figure 1:
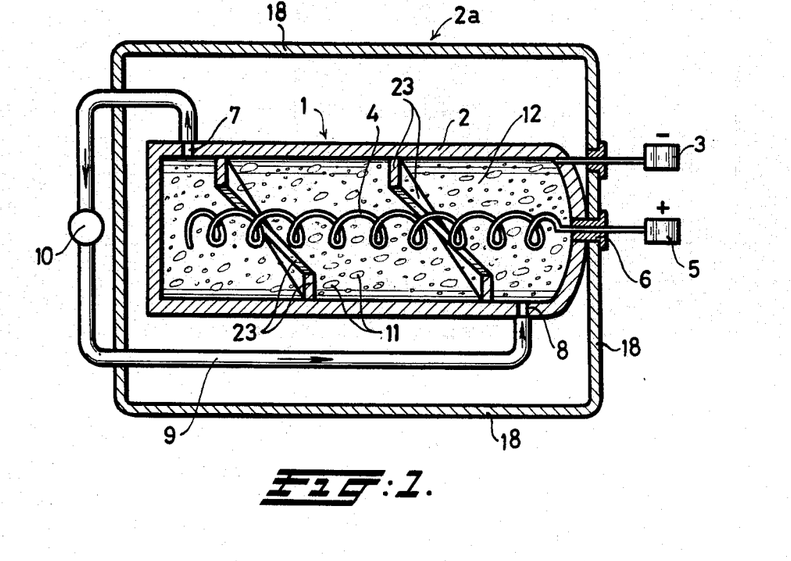
FIG. 1 is a longitudinal sectional view of a first embodiment of an electric battery according to the invention.

FIG. 1 shows an electric battery cell 1 comprising a metal tube 2 of stainless steel electrically conductively connected to a cathode terminal 3.

The steel tube 2 forms an electrolyte-accommodating chamber 12 comprising an electrolyte consisting of 2N potassium hydroxide having zinc particles 11 suspended therein.

The suspension of electrolyte with zinc particles suspended therein can be circulated by means of a pump 10 which, on one side, is connected to the electrolyte-accommodating chamber outlet 7 via a conduit 9, and, on the other side, to an electrolyte-accommodating chamber inlet 8.

Centrally in the electrolyte-accommodating chamber 12 there is disposed an electrode 4 connected to an anode terminal 5, through an insulated passage 6.

Figure 2:
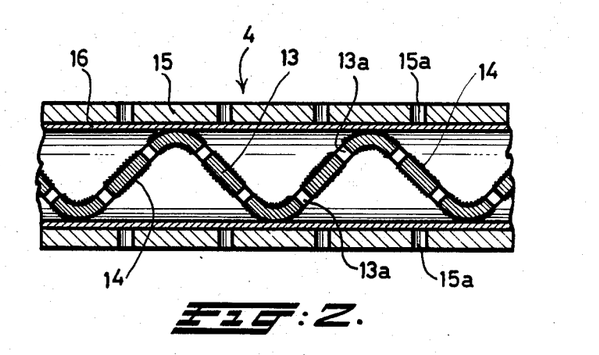
FIG. 2 is a view of a portion of the central electrode used in FIG. 1 and surrounded by a flowing suspension of electrolyte having particles of active material suspended therein.

FIG. 2 shows the electrode 4 in more detail. The electrode 4 consists of a zigzag-wound copper inner layer 13 having openings 13a, upon which an activated nickel outer layer 14 is provided as a second active material. The zigzag-shaped copper inner layer together with the activated nickel outer layer 14 is wrapped in finely porous material 16, on the outer side of which there is provided a porous insulated layer 15, for example made from perforated plastic or a fabric and having openings 15a. The finely porous material 16 consists, for example, of polyester.

The zinc particles contained in the electrolyte are advantageously adhered to organic fibers, such as cellulose fibers or plastic fibers, permitting electrically conductive particles such as carbon particles, which are among others inert with respect to the electrolyte, to be provided upon or within the fibers. Cellulose fibers provide very excellent results and are thus preferred at present.

Instead of cellulose fibers, conducting carbon fibers can also be used effectively.

Advantageously, the particles 11 suspended in the electrolyte, in the form of zinc particles, are provided with a wear-resistant layer, such as a layer of tanned hydrophilic polyvinyl alcohol or polyvinyl acetate.

The said wear-resistant layer may also contain electrically conductive particles, which are inert with respect to the electrolyte, such as conductive carbon particles.

The electric battery in the form of a tubular element 2 can be surrounded by an insulating casing 2a having movable walls 18.

Inclusion of the various tubular elements 1 within an insulated casing enables the heat generated during the chemical to be retained inside the casing, thus heating the tubular element and the electrolyte, which leads to a much higher operating temperature of, e.g., 50° to 55° C. At such a temperature, a current intensity can be anticipated which is ten times higher as compared to the current intensity obtained at ambient temperature.

Figure 3:
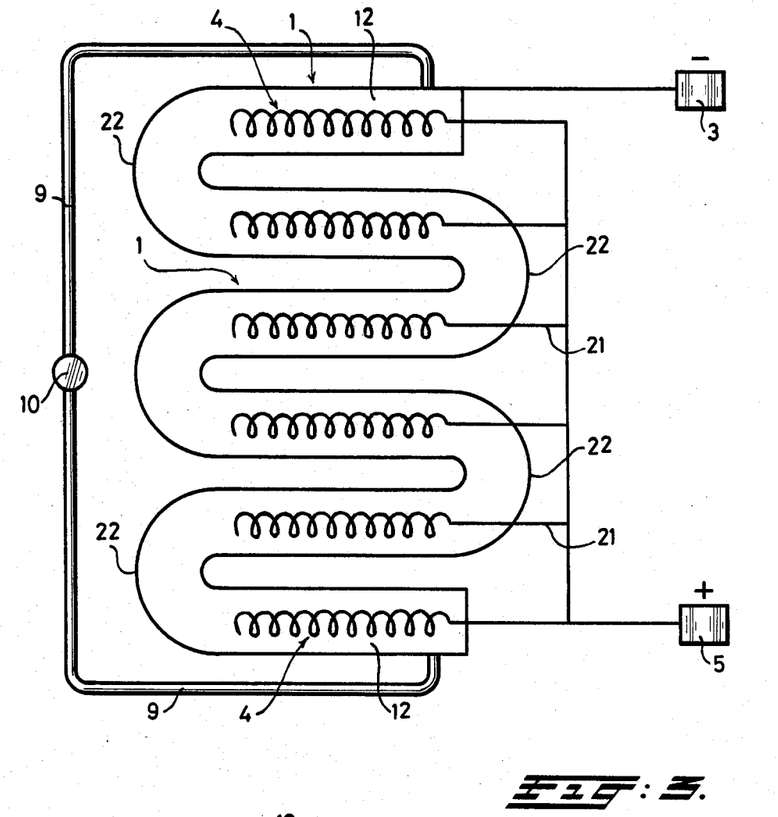
FIG. 3 is a view of an electric battery according to the invention, composed of several tubular elements.

FIG. 3 shows another embodiment in which several horizontally disposed tubular elements 1 are interconnected in series while using connecting members 22, which connecting members effectively consist of metal.

In each tubular element there is located an electrode 4. In this embodiment the assembly also is surrounded by a casing 2a (not shown).

Constructing a portion or all the walls 18 of the insulating casing 2a in such a manner that they can be opened renders it possible to control the temperature within the insulating casing 2a and to obtain an adjustable temperature within the casing, thus also enabling battery operation at a very specific temperature.

It is furthermore possible to temporarily disconnect one or several tubular elements from the power supply circuit, and to engage the tube wall as a resistor until the desired temperature has been attained, thus causing a uniform temperature throughout.

It is also possible to maintain the operating temperature as a function of a thermostat-controlled position of the movable walls 18 of the insulating casing 2a.

Figure 4:
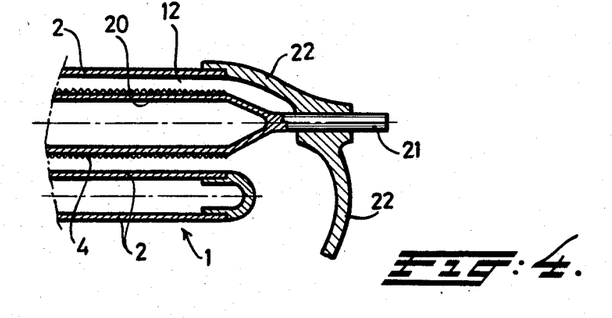
FIG. 4 is a view of a portion of still another embodiment of the invention.

FIG. 4 shows a portion of another embodiment of the invention in which within a tubular element 2 there is located another tubular element 20. The space resulting between the outer tube 2 and the inner tube 20 forms the electrolyte-accommodating chamber 12. The metal part of the electrode in this case abuts against the wall of the inner metal tube 20, as a result of which the latter can serve as a current collector.

For the purpose of coupling two such cells, a nickel-plated pole member 21 is used to connect the tube 20 to the anode.

Connecting members 22 are in this case also used for interconnecting several cells.

It is worth while to fix a screw-shaped band 23 on the inside of the outer tube 1, (FIG. 1), the band acting as turbulence-generating means, which, when the mass of electrolyte with particles suspended therein is being circulated, brings about a better contact between the active particles and the metal wall. By enhancing the chance of collision of the metal wall with the particles of the active material, the electric battery is able to deliver greater power.

After a long period of operational stoppage, the battery according to the invention can be easily started up because, after the electrolyte circulation has been stopped, the battery of the invention remains in fact capable of supplying current. For, in the electrolyte-accommodating chamber, the suspension will settle out and will, in the locations where the chamber 12 is filled up somewhat between the tube wall and the central electrode, function as a current-supplying cell. This energy is sufficient for the circulating pump 10 to start, as a result of which the power immediately increases and the cell will automatically supply greater power while increasing the temperature.

Figure 5:
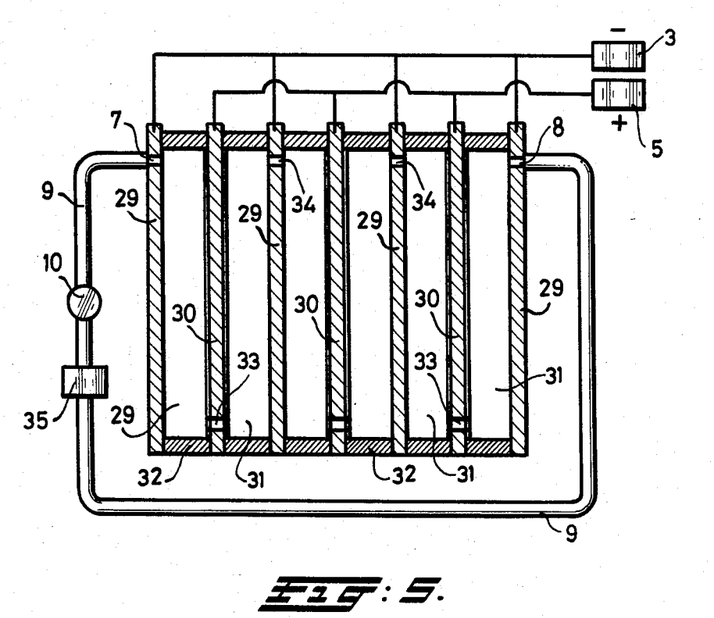
FIG. 5 is a sectional view of an electric battery composed of several plate-shaped elements.

FIG. 5 shows a battery composed of plates 29 and plates 30, the plates forming compartments 31, due to the sealing strips 32.

The battery is provided with an inlet and an outlet connected to a circulating pump 10, affording electrolyte with zinc particles suspended therein to be circulated.

Figure 6:
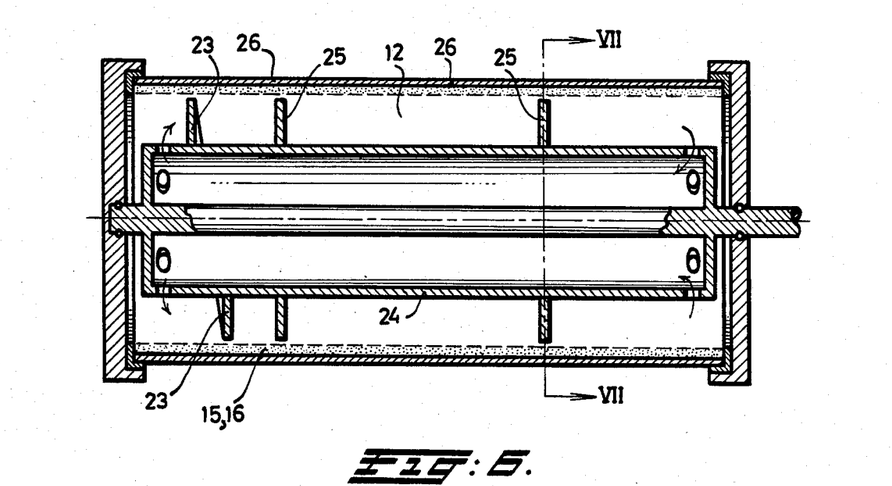
FIG. 6 is a longitudinal sectional view of another embodiment of an electric battery according to the invention.

The plates 29 are stainless steel plates, the plates 30 carrying an active nickel mass provided with a separating walls 15 and 16 (see FIGS. 2, 6). To achieve a proper flow, each compartment 31 is provided at one end with a first opening 33 and at the other end with a second opening 34.

For proper temperature control, electrolyte can be cooled during recirculation outside the compartments by using a cooling member 35. The cooling may be effected with air or water.

The battery having plates is particularly suitable for use at high temperatures of the electrolyte, thus causing the reaction velocity in the accumulator to proceed remarkably faster.

The active material advantageously consists of, on the one hand, nickel oxide-hydroxide, and, on the other hand, zinc, the zinc being comprised in the electrolyte and supported by cellulose fibers.

In order to obtain sufficient current passage via collisions of suspended particles with an electrode, the suspended particles must be rather mobile so that, when the electrolyte is being circulated, they come into contact with the electrode often enough within a specific time unit.

If a certain amount of energy is to be stored into an electric battery according to the invention, this may result in large battery dimensions.

By using highly concentrated suspensions, for example 100 parts by weight of particles of the active material per 100 parts by weight of electrolyte, this drawback can be eliminated, but in such case the likelihood of the particles of such a concentrated, frequently pasty suspensions making sufficient contact with the electrode, is very small.

FIG. 6 shows an electric battery according to the invention which is particularly adapted for using concentrated suspensions of particles of an active material in electrolyte.

In this battery, the circulating means are provided within the electrolyte-accommodating chamber 12. These circulating means comprise a shaft 24 which is rotatably disposed in the longitudinal direction of the battery and which is located within a tubular element 2.

The shaft may be provided with pins 25 extending to close proximity of the inner wall of the tubular element 2, these pins properly stirring the concentrated suspension.

By using a screw-shaped band 26 on the shaft 24, it is possible to effectively propel the suspension of electrolyte with particles of the active material. In order to ensure proper temperature distribution and control, the shaft may either be disposed excentrically or the propelled suspension transported via one end of the hollow shaft to the other end of the hollow shaft.

It is obviously also possible to completely discharge the suspension being propelled from, at one end of the electrolyte-accommodating chamber and, after temperature correction, to reintroduce the same into the electrolyte-accommodating chamber at the other end.

Figure 7:
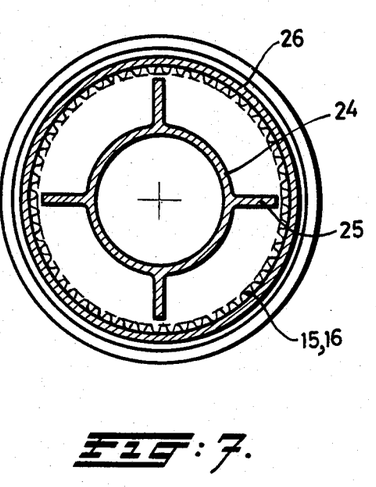
FIG. 7 is a cross-sectional view of the electric battery of FIG. 6 taken on line VII—VII.

Although in principle it is possible to construct the central shaft 24 as an anode, this results in a complicated construction. An embodiment, in which the outer wall 26 of a tubular accumulator cell forms the anode 26, is therefore preferred. The anode 26 preferably consists of a nickel tube provided with a layer of nickel oxide-nickel hydroxide covered with a porous separating layer 15, 16 (FIG. 7).

Figure 8:
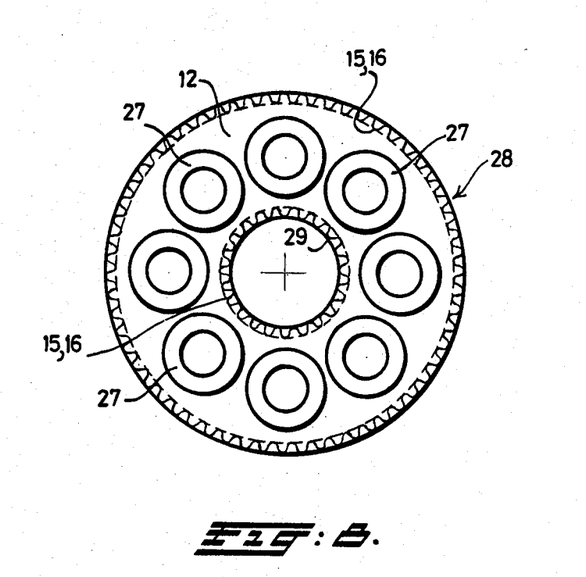
FIG. 8 is a sectional view of still another embodiment of the electric battery according to the invention.

FIG. 8 shows a sectional view of an electric battery, in which several stirrers 27 are disposed in the electrolyte-accommodating chamber 12, the stirrers being active as cathodes, while the casing 28 and the tube 29 disposed therein both contain another active material 14 on carrier 13 and consequently act as anodes. The stirrers 27 when rotating ensure a good chance of contact with the particles of the active material in the electrolyte. In this type of battery, it is also possible to use highly concentrated suspensions of electrolyte and particles of active material, especially if the stirrers are provided with helical blades. In such case, the stirrers 26 not only agitate the suspension, but can also transport it in the same manner as explained for FIGS. 6 and 7.

The battery of the invention is easily rechargeable by connecting it to an electrical power source.

Figure 9:
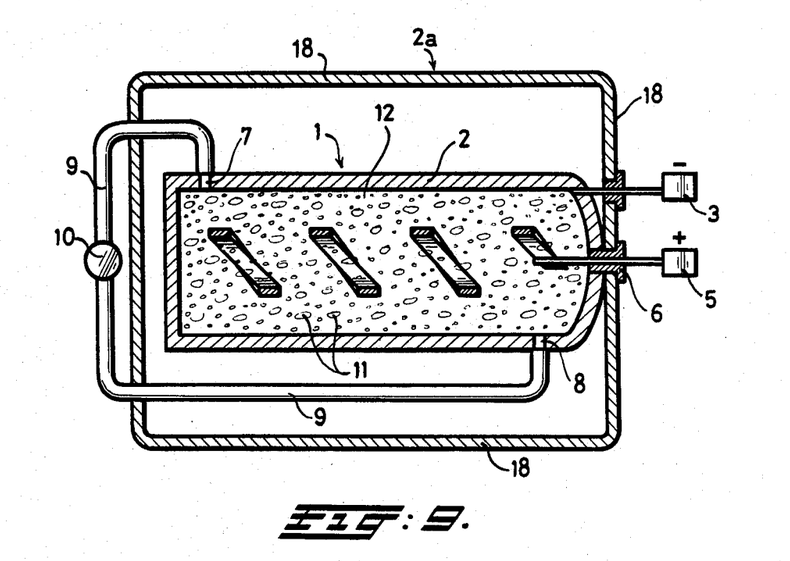
FIG. 9 is a sectional view of an accumulator having a specific embodiment of an electrode.

FIG. 9 shows the same battery as FIG. 1, but the electrolyte-accommodating chamber herein advantageously contains a helically wound band acting as tubulence-generating means.

Figure 10:
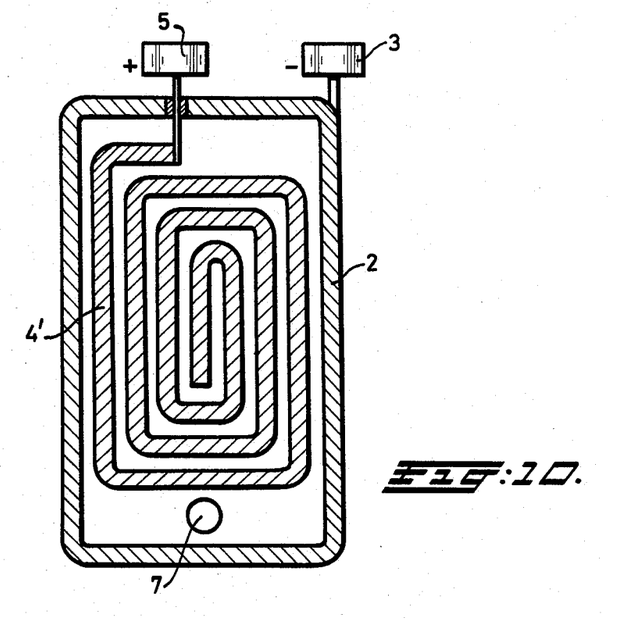
FIG. 10 is a longitudinal sectional view of a battery according to the invention, having a flatwise wound helical electrode.

FIG. 10 shows still another embodiment in which a central electrode 4', disposed in a central tube 2, is helically wound in a plane acting as turbulence generating means.

This embodiment provides particularly good results.

What is claimed is:

1. An electric battery comprising a casing provided with an electrolyte-accommodating chamber containing an electrolyte, at least two metal electrodes in contact with the electrolyte and having electrode terminals, two metal-containing active materials which can each electrically conductively communicate with one electrode only, a porous separator for separating the two metal-containing active materials, and electrolyte-circulating means for circulating the electrolyte in the electrolyte-accommodating chamber, a first of said two metal-containing active materials comprising a plurality of composite particles which are movable suspended in said electrolyte, each of said composite particles including a zinc particle supported by a particle of inactive fibrous material.

2. An electric battery according to claim 1, wherein each particle of inactive fibrous material consists of cellulose fibers.

3. An electric battery according to claim 1, wherein each composite particle includes an outer layer of a thin, porous, wear-resistant material.

4. An electric battery according to claim 1, wherein each outer layer of thin, porous, wear resistant material includes electrically-conductive carbon particles.

5. An electric battery according to claim 1, wherein the electrolyte circulating means is selected from the group consisting of
   (1) a pump connected to an outlet and an inlet of the electrolyte-accommodating chamber,
   (2) electrolyte-circulating means located in an electrolyte containing chamber,
   (3) electrolyte-circulating means located in an electrolyte-accommodating chamber being provided with liquid-stirring and/or liquid-driving members, and
   (4) electrolyte-circulating means comprising at least one stirring member.

6. An electric battery according to claim 1, including turbulence-generating members in the electrolyte-accommodating chamber, said turbulence-generating members being selected from the group consisting of a helical band attached to the wall of an electrode and a helically or non-helically wound ribbon shaped electrode which is helically wound in one plane.

7. An electric battery according to claim 1, wherein one of said two metal electrodes comprises a zigzag-folded, porous metal strip, wherein the second of said two metal-containing active materials comprises a plurality of metal layers on said porous metal strip at spaced apart locations along its length, and wherein said porous separator comprises a tube of porous material surrounding said porous metal strip with metal layers thereon.

8. An electric battery according to claim 7, wherein said porous metal strip consists of copper, and wherein said plurality of metal layers around said porous metal strip contain nickel, nickel-oxide and nickel hydroxide.

9. An electric battery according to claim 3, wherein said thin, porous, wear-resistant layer is composed of a tanned polymer selected from the group consisting of polyvinyl alcohol and polyvinyl acetate.

10. An electric battery according to claim 1, wherein said electrolyte consists of 2N potassium hydroxide.

* * * * *

UNITED STATES PATENT AND TRADEMARK OFFICE
CERTIFICATE OF CORRECTION

PATENT NO.  : 4,663,255
DATED       : May 5, 1987
INVENTOR(S) : Lodewijk Anselrode It is certified that error appears in the above-identified patent and that said Letters Patent is hereby corrected as shown below:

On the Title Page, Item [75] should read:

[75]  Inventor:  Lodewijk Anselrode, St. Anthonis, Netherlands

Signed and Sealed this

Eleventh Day of August, 1987

*Attest:*

DONALD J. QUIGG

*Attesting Officer*    *Commissioner of Patents and Trademarks*